US012706410B2

(12) United States Patent
Chen et al.

(10) Patent No.: US 12,706,410 B2
(45) Date of Patent: Aug. 11, 2026

(54) CONNECTOR POSITION ASSURANCE FOR AN ELECTRICAL CONNECTOR

(71) Applicant: Lear Corporation, Southfield, MI (US)

(72) Inventors: Jiayun Chen, Shanghai (CN); Jianwei Guo, Shanghai (CN); Chao Fang, Shanghai (CN)

(73) Assignee: Lear Corporation, Southfield, MI (US)

( * ) Notice: Subject to any disclaimer, the term of this patent is extended or adjusted under 35 U.S.C. 154(b) by 281 days.

(21) Appl. No.: 18/383,657

(22) Filed: Oct. 25, 2023

(65) Prior Publication Data

US 2024/0145977 A1 May 2, 2024

(30) Foreign Application Priority Data

Oct. 26, 2022 (CN) ......................... 202211318058.1

(51) Int. Cl.
*H01R 13/436* (2006.01)
*H01R 13/627* (2006.01)

(52) U.S. Cl.
CPC ....... *H01R 13/436* (2013.01); *H01R 13/6272* (2013.01)

(58) Field of Classification Search
CPC .......................... H01R 13/436; H01R 13/6272
USPC .................................................. 439/345, 352
See application file for complete search history.

(56) References Cited

U.S. PATENT DOCUMENTS

| | | | | |
|---|---|---|---|---|
| 4,946,395 | A * | 8/1990 | Cope | H01R 13/6272 439/352 |
| 6,045,388 | A | 4/2000 | Higgins et al. | |
| 7,399,195 | B2 * | 7/2008 | Kim | H01R 13/6272 439/352 |
| 8,137,142 | B1 * | 3/2012 | Dawson | H01R 13/639 439/676 |
| 8,926,355 | B2 | 1/2015 | Heil et al. | |
| 9,325,114 | B2 | 4/2016 | Miklinski et al. | |
| 9,407,026 | B2 | 8/2016 | Campbell et al. | |
| 9,608,369 | B1 | 3/2017 | Brandt et al. | |
| 9,680,256 | B1 | 6/2017 | Lane et al. | |
| 9,831,601 | B2 | 11/2017 | Kim | |
| 9,979,131 | B2 | 5/2018 | Venkatesan et al. | |
| 10,340,632 | B1 | 7/2019 | Rangi et al. | |
| 10,396,486 | B2 | 8/2019 | de Chazal et al. | |
| 10,454,199 | B1 | 10/2019 | Christiano et al. | |

* cited by examiner

*Primary Examiner* — Gary F Paumen
(74) *Attorney, Agent, or Firm* — MacMillan, Sobanski & Todd, LLC

(57) ABSTRACT

An electrical connector includes a housing that is adapted to mate with a corresponding electrical connector. A connector latch is attached to the housing and is adapted to retain the housing in a mounted position on the corresponding connector. A connector position assurance is also attached to the connector latch. The connector position assurance is movable from a pre-lock position to an assurance position when the housing is attached to the corresponding connector. A block engages the connector position assurance when the connector position assurance is moved from the pre-lock position to the assurance position. The block resists movement of the connector position assurance to the assurance position.

20 Claims, 11 Drawing Sheets

CONNECTOR POSITION ASSURANCE FOR AN ELECTRICAL CONNECTOR

BACKGROUND OF THE INVENTION

This invention relates to electrical connectors. More specifically, this invention relates to an improved structure for a connector position assurance for an electrical connector.

Electrical components are often connected to one other using conductive cables, and electrical connectors attached to the cables allow the components to be connected at a desired time. For example, electrical components from different sources can be brought together during the manufacture of a larger assembly. In order to ensure that the components are properly connected during assembly, it is known to use a connector position assurance on the electrical connector. The connector position assurance is typically located on a first electrical connector and can only be moved to its locked position after the first electrical connector is properly mated with a corresponding second electrical connector. Once it is in the locked position, the connector position assurance prevents the first and second electrical connectors from being separated from each other. It would be desirable to provide an improved connector position assurance for an electrical connector.

SUMMARY OF THE INVENTION

This invention relates to an electrical connector. The electrical connector includes a housing that is adapted to mate with a corresponding electrical connector. A connector latch is attached to the housing and is adapted to retain the housing in a mounted position on the corresponding connector. A connector position assurance is also attached to the connector latch. The connector position assurance is movable from a pre-lock position to an assurance position when the housing is attached to the corresponding connector. A block engages the connector position assurance when the connector position assurance is moved from the pre-lock position to the assurance position. The block resists movement of the connector position assurance to the assurance position.

In another embodiment, the electrical connector includes a terminal housing that is adapted to hold one or more electrical terminals. The connector housing includes a connector seat, and a portion of the terminal housing is held in the connector seat. The connector position assurance includes a housing block that extends toward the connector seat to limit deflection of the connector seat.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
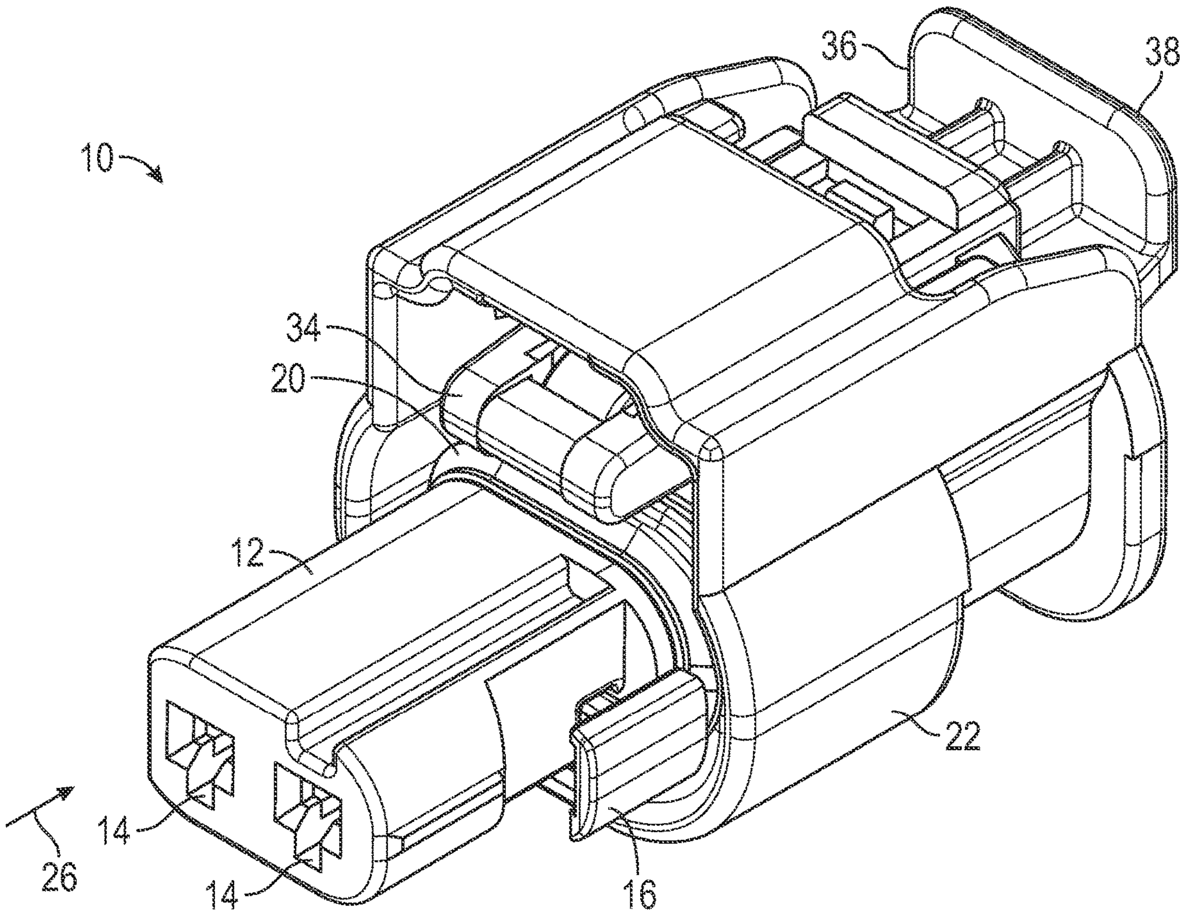
FIG. 1 (Prior Art)
FIG. 1 is a front perspective view of a prior art electrical connector.
Figure 2:
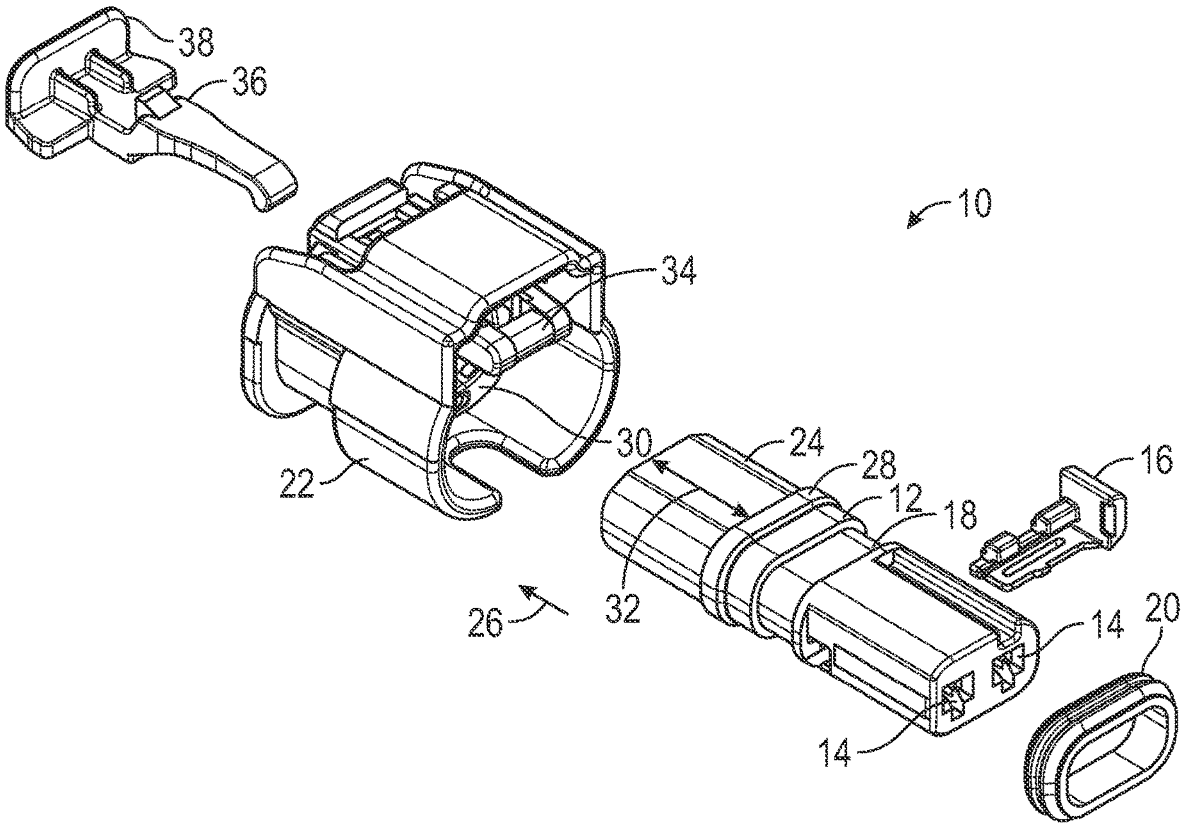
FIG. 2 (Prior Art)
FIG. 2 is an exploded rear perspective view of the prior art electrical connector illustrated in FIG. 1.
Figure 3:
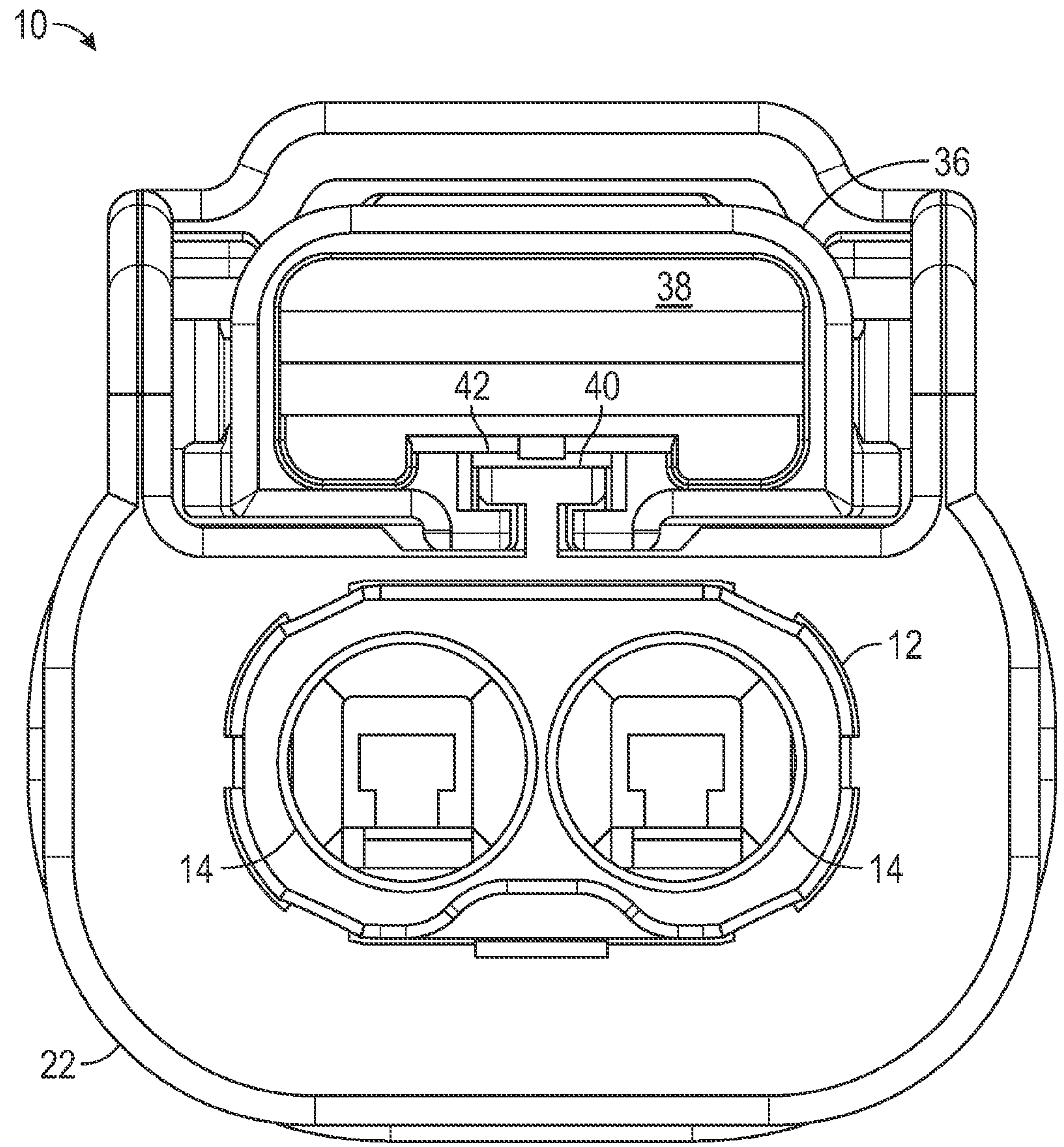
FIG. 3 (Prior Art)
FIG. 3 is an end elevational view of the prior art electrical connector illustrated in FIGS. 1 and 2.

Referring now to the drawings there is illustrated in FIGS. 1, 2, and 3 a prior art electrical connector, indicated generally at 10, including a terminal housing 12 having two terminal cavities 14. Each of the terminal cavities 14 is adapted to receive an electrical terminal (not shown). A terminal position assurance 16 is attached to the terminal housing 12 and is adapted to function as a secondary lock to retain the electrical terminals in the respective terminal cavities 14. The terminal housing 12 also includes a seal seat 18 having a peripheral seal 20 positioned thereon. The electrical connector 10 further includes a connector housing 22.

To assemble the prior art electrical connector 10, a portion 24 of the terminal housing 12 is inserted into the connector housing 22. Then, the terminal housing 12 is moved in an assembly direction 26 relative to the connector housing 22 so that a stop 28 on the terminal housing 12 engages a flange 30 on the connector housing 22. This prevents the terminal housing 12 from being moved farther in the assembly direction 26 relative to the connector housing 22 and prevents the connector housing 22 from engaging the peripheral seal 20. The connector housing 22 engages the portion 24 of the terminal housing 12 to retain the terminal housing 12 in position relative to the connector housing 22. The portion 24 of the terminal housing 12 may, if desired, have an axial length 32 (measured parallel to the assembly direction 26) of approximately 9 mm.

The prior art electrical connector 10 is adapted to mate with a corresponding connector (not shown) that is also known in the art. To facilitate this, the connector housing 22 includes a latch 34 that engages a portion of the corresponding connector to retain the prior art electrical connector 10 mated on the corresponding connector. The prior art electrical connector 10 includes a connector position assurance 36 that is attached to the latch 34 (shown in an opened position in FIG. 1). The connector position assurance 36 is movable from the opened position to a closed position when the prior art electrical connector 10 is mated with the corresponding connector. When the connector position assurance 36 is in the closed position, it prevents the latch 34 from being released from the corresponding connector, such as described in U.S. Pat. No. 9,425,534 for example. The connector position assurance 36 includes an actuating portion 38 that allows an operator to move the connector position assurance 36 between the open position and the closed position.

As best shown in FIG. 3, the connector housing 22 includes a T-shaped rail 40 that is received within a similarly shaped groove 42 in the connector position assurance 36. Thus, the connector position assurance 36 can be moved axially relative to the connector housing 22 (parallel to the assembly direction 26), but is prevented from being moved otherwise relative to the connector housing 22.

FIG. 4 through 15 illustrate the structure and operation of an improved electrical connector, indicated generally at 44, in accordance with the invention. The electrical connector 44 may be adapted to mate with the corresponding connector discussed above (not shown) and, thus, be intended for use as an alternative for the previously described prior art electrical connector 10. Consequently, the electrical connector 44 of this invention may be designed to fit in the same physical space as the prior art electrical connector 10 discussed above, although such is not required.

The electrical connector 44 includes a terminal housing 46. The illustrated terminal housing 46 is molded from plastic. However, the terminal housing 46 may be composed of any desired material or combination of materials and may be manufactured using any desired process. The illustrated terminal housing 46 includes two terminal cavities 48, although a greater or lesser number of such terminal cavities may be provided. Each of the terminal cavities 48 extends through the terminal housing 46 and defines a respective terminal axis 50. Each of the terminal cavities 48 is adapted to receive and support a respective electrical terminal (not shown) that may, for example, be inserted therein by movement in an insertion direction 52 along the respective terminal axis 50.

The electrical connector 44 also includes a terminal position assurance 54. The illustrated terminal position assurance 54 is molded from plastic. However, the terminal position assurance 54 may be composed of any desired material or combination of materials and may be manufactured using any desired process. The terminal position assurance 54 includes a base 56 having two sliders 58 that extend from the base 56 in an assurance direction 60. The illustrated sliders 58 are located on opposite ends of the base 56. A support 62 is attached to each of the sliders 58 and is spaced apart from the base 56. The terminal position assurance 54 also includes a resilient lock arm 64 that is attached to the base 56 and the support 62. The lock arm 64 includes a wedge-shaped pre-lock catch 66 and a block-shaped lock catch 68.

Figure 7:
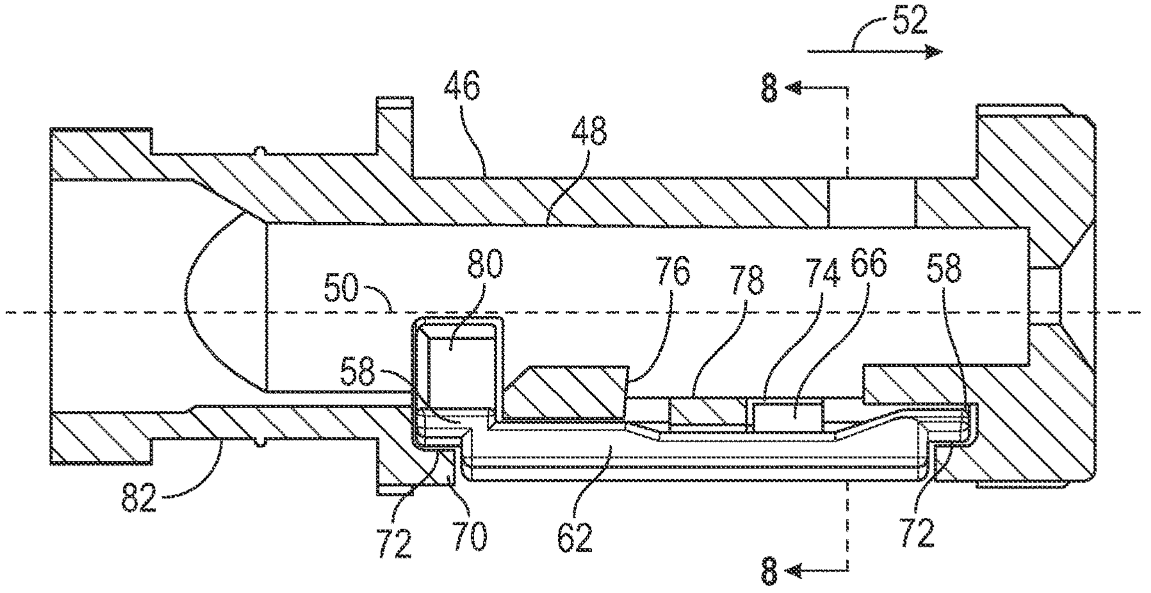
FIG. 7 is a cross-sectional view of the terminal housing illustrated in FIG. 5 showing the terminal position assurance in a pre-lock position.
Figure 8:
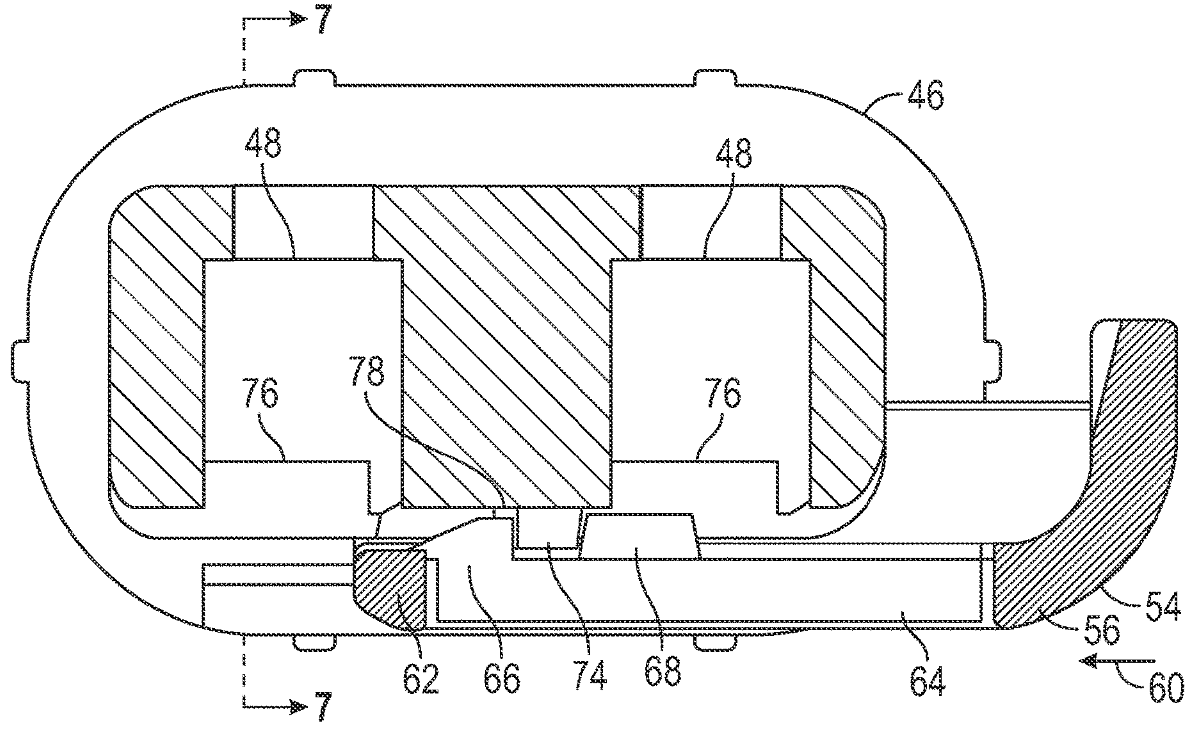
FIG. 8 is a cross-sectional view taken along line 8-8 of FIG. 7.
Figure 9:
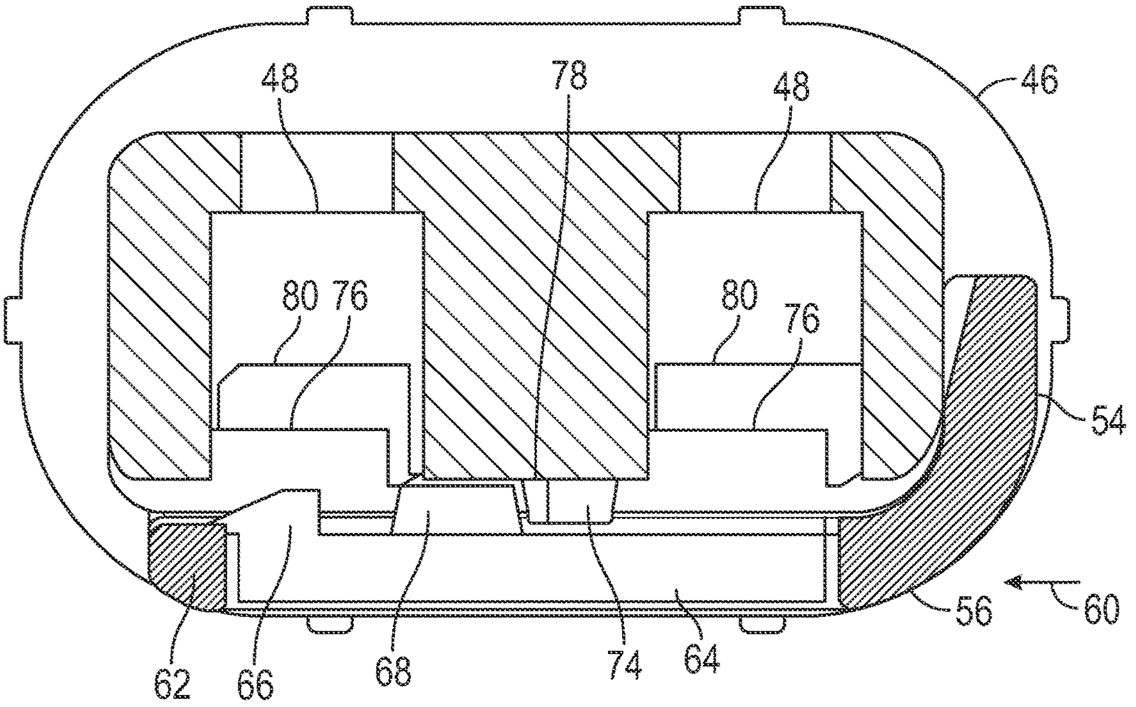
FIG. 9 is a cross-sectional view similar to FIG. 8 showing the terminal position assurance in an assurance position.

Referring back to FIG. 5 and also to FIG. 7, to attach the terminal position assurance 54 to the terminal housing 46, the terminal position assurance 54 is initially positioned adjacent to the terminal housing 46 such that the support 62 faces the terminal housing 46. Then, the terminal position assurance 54 is moved in the assurance direction 60 into a slot 70 on the terminal housing 46. The assurance direction 60 is perpendicular to the insertion direction 52, and the slot 70 extends across both of the terminal cavities 48.

As previously described, the sliders 56 of the terminal position assurance 54 are located on opposite ends of the base 56. The sliders 58 are located in a respective channel portions 72 of the slot 70. Thus, the terminal position assurance 54 can be moved relative to the terminal housing 46 in a direction that is parallel to the assurance direction 60.

The terminal housing 46 includes a pre-lock stop 74. The illustrated pre-lock stop 74 is a molded projection on the terminal housing 46 that extends into the slot 70 and is located between the two terminal cavities 48. When the terminal position assurance 54 is initially moved in the slot 70 in the assurance direction 60, the pre-lock catch 66 on the terminal position assurance 54 initially engages the pre-lock stop 74. As a result, further movement of the terminal position assurance 54 in the assurance direction 60 is initially resisted. However, when a sufficient amount of force is subsequently applied to overcome this initial resistance, the lock arm 64 (and the pre-lock catch 66 supported on the lock arm 64) is deflected away from the pre-lock stop 74. This allows the terminal position assurance 54 to be moved further in the assurance direction 60 to the pre-lock position shown in FIGS. 7 and 8. In this pre-lock position, the lock arm 64 (and the pre-lock catch 66 supported on the lock arm 64) rebounds to the pre-lock position best shown in FIG. 8. When the terminal position assurance 54 is in the pre-lock position, the pre-lock catch 66 engages the pre-lock stop 74 to prevent movement of the terminal position assurance 54 opposite the assurance direction 60 relative to the terminal housing 46. When the terminal position assurance 54 is in the pre-lock position, the electrical terminals (not shown) may be inserted into the terminal cavities 48. Each terminal cavity 48 includes a ledge 76 that is adapted to engage a lance provided on the associated electrical terminal to retain the electrical terminal in the terminal cavity 48.

The terminal housing 46 also includes a lock stop 78. The illustrated lock stop 78 is also a molded projection on the terminal housing 46 that extends into the slot 70 and is located between the two terminal cavities 48. As best shown in FIG. 7, the pre-lock stop 74 and the lock stop 78 are located adjacent to each other, but separated in the insertion direction 52. However, the pre-lock stop 74 and the lock stop 78 may be located in any desired relative positions and may, for example, be located in the same projection into the slot 70. When the terminal position assurance 54 is in the pre-lock position, the lock catch 68 engages the lock stop 78 to initially resist movement of the terminal position assurance 54 in the assurance direction 60 relative to the terminal housing 46. However, when a sufficient amount of force is applied to overcome this initial resistance, the lock arm 64 (and the lock catch 68 supported on the lock arm 64) are deflected away from the lock stop 78. When the terminal position assurance 54 is moved in the assurance direction 60 to the locked position, the lock arm 64 (and the lock catch 68 supported on the lock arm 64) are rebound to the position shown in FIG. 9. When the terminal position assurance 54 is in the locked position, the lock catch 68 engages the lock stop 78 to prevent movement of the terminal position assurance 54 opposite the assurance direction 60 relative to the terminal housing 46.

The terminal position assurance 54 also includes secondary locks 80. The illustrated secondary locks 80 are molded as part of one of the sliders 58 but may be located on any desired part of the terminal position assurance 54. When the terminal position assurance 54 is in the locked position, each of the secondary locks 80 is located in one of the terminal cavities 48 and is adapted to prevent the electrical terminal from being removed from that terminal cavity 48.

Referring back to FIG. 5, the terminal housing 46 includes a seal seat 82 that is provided on the outer surface thereof. The illustrated seal seat 82 is a channel on the terminal housing 46 that extends around the periphery of the terminal housing 46. The electrical connector 44 may also include an optional seal 84 that can be supported on the seal seat 82. The terminal housing 46 further includes a retained portion 86 that extends from the seal seat 84 to an insertion end 88. To install the seal 84 on the seal seat 82, the insertion end 88 is inserted into the seal 84, and the seal 84 is moved across the retained portion 86 to the seal seat 82. The illustrated retained portion 86 has a substantially uniform outer surface from the insertion end 88 to the seal seat 82, although such is not required. The illustrated retained portion 86 also has a substantially consistent outer geometry between the insertion end 88 and the seal seat 82, although again such is not required. Unlike the prior art terminal housing 12, the illustrated retained portion 86 does not have a stop located adjacent to the seal seat. This makes it easier to install the seal 84 on the terminal housing 46.

Figure 5:
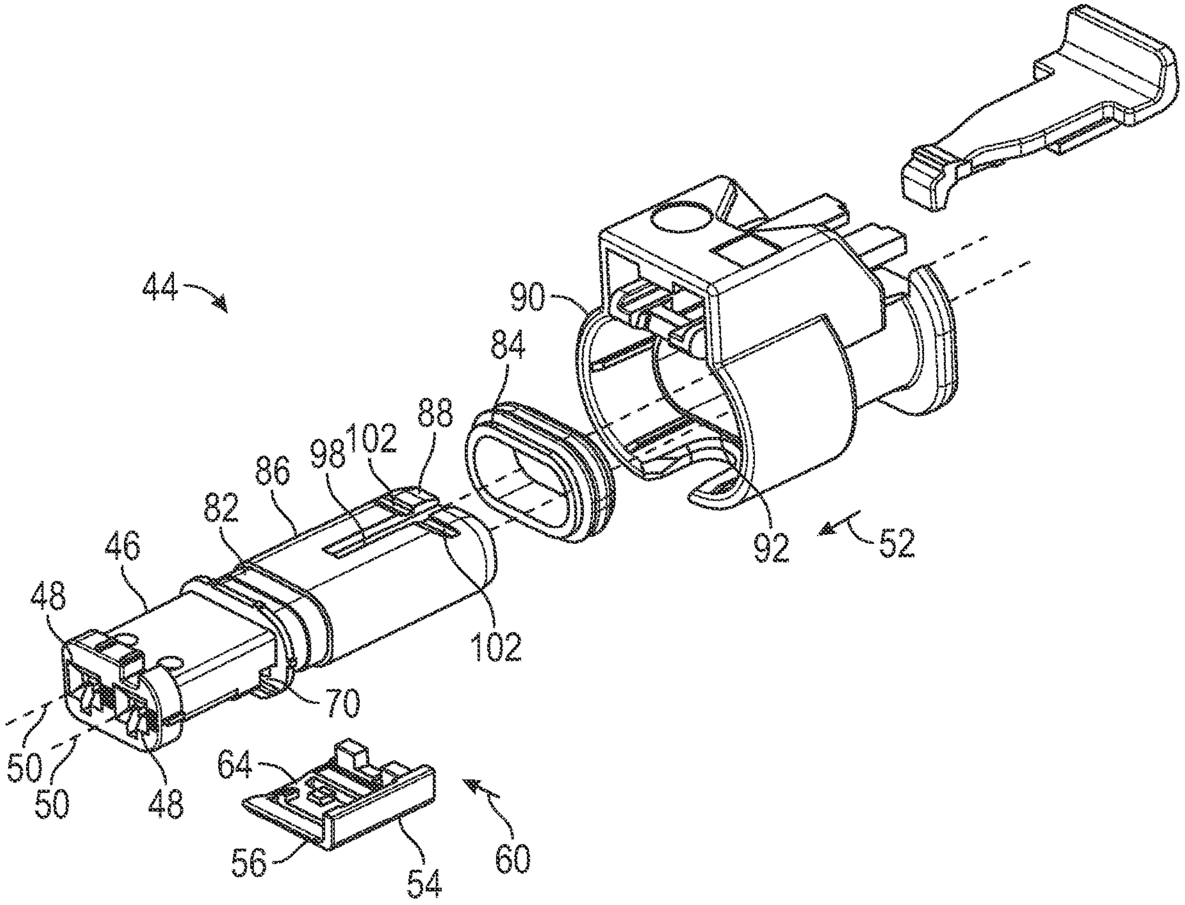
FIG. 5 is an exploded front perspective view of the electrical connector illustrated in FIG. 4 including a terminal housing, a terminal position assurance, a peripheral seal, a connector housing, and a connector position assurance.
Figure 6:
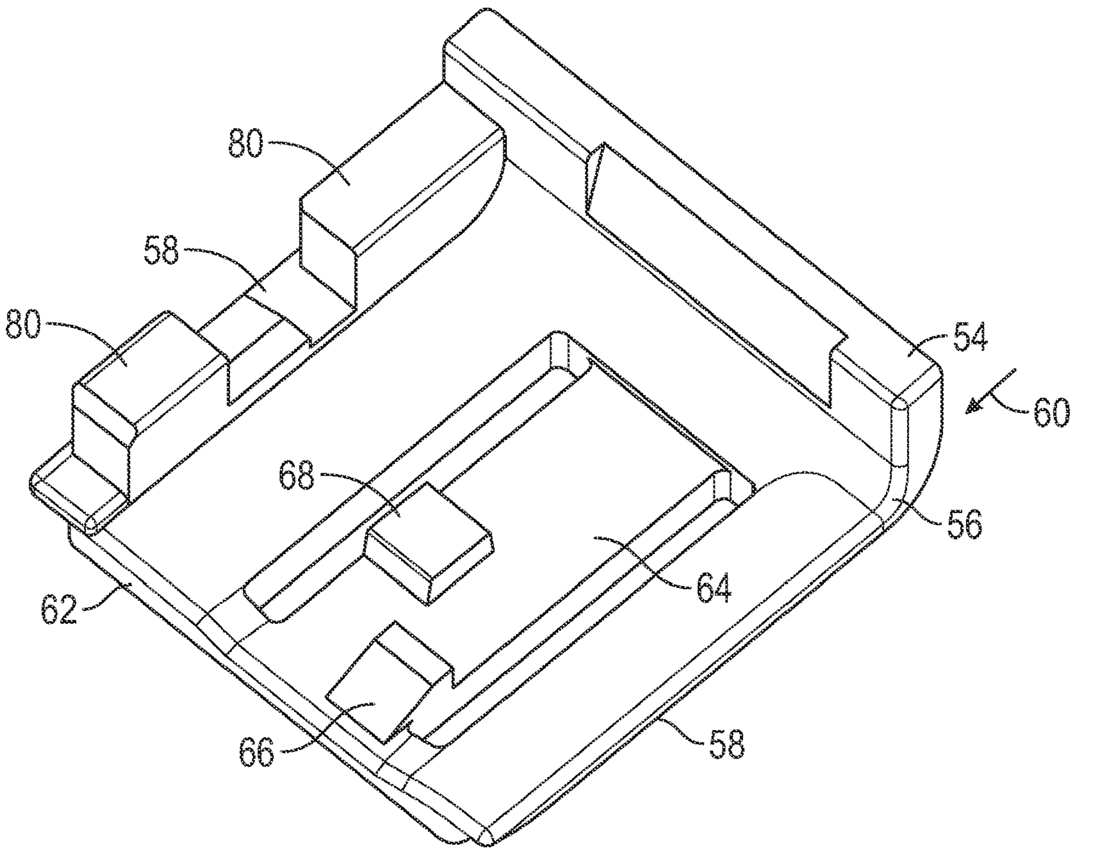
FIG. 6 is an enlarged rear perspective view of the terminal position assurance illustrated in FIG. 5.
Figure 11:
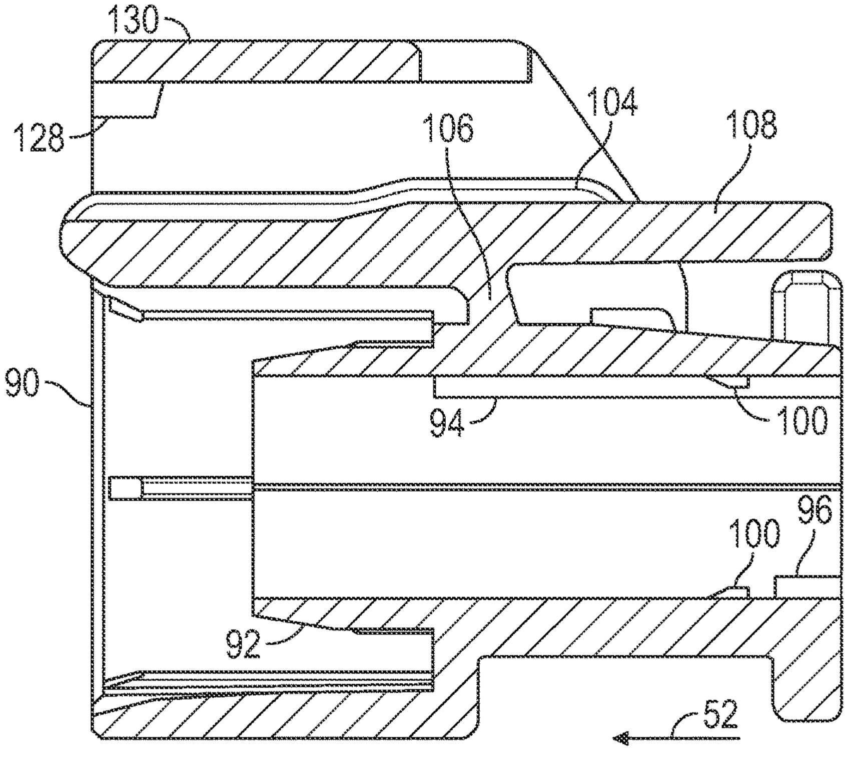
FIG. 11 is a cross-sectional view taken along line 11-11 of FIG. 10.

The electrical connector 44 also includes a connector housing 90 that is molded from plastic. However, the connector housing 90 may be made of any material or combination of materials and by any desired process. The illustrated connector housing 90 includes a housing seat 92 that is adapted to hold the terminal housing 46. To connect the terminal housing 46 to the connector housing 90, the terminal housing 46 is initially aligned with the housing seat 92 such that the insertion end 88 faces the housing seat 92, as shown in FIG. 5. Then, the connector housing 90 is moved relative to the terminal housing 46 in the insertion direction 52 so that the retained portion 86 enters the terminal seat 92. The connector housing 90 includes guides 94 and 96 provided on the housing seat 92. The illustrated guides 94 and 96 are raised tabs that extend in the insertion direction 52. As best shown in FIG. 5, the terminal housing 46 has a corresponding guide slot 98 provided in the retained portion 86. Although not shown in FIG. 5, the terminal housing 46 also includes a second guide slot on the opposite side of the terminal housing 46. When the terminal housing 46 is positioned in the housing seat 92, the guides 94 cooperate with the guide slots 98 in order to properly orient the terminal housing 46 relative to the connector housing 90. As shown in FIG. 11, the guide 94 extends further in the insertion direction 52 than the guide 96. The guide slots 98 have similar lengths and thus function as a poka yoke to prevent the terminal housing 46 from being installed in an incorrect orientation relative to the connector housing 90.

Figure 4:
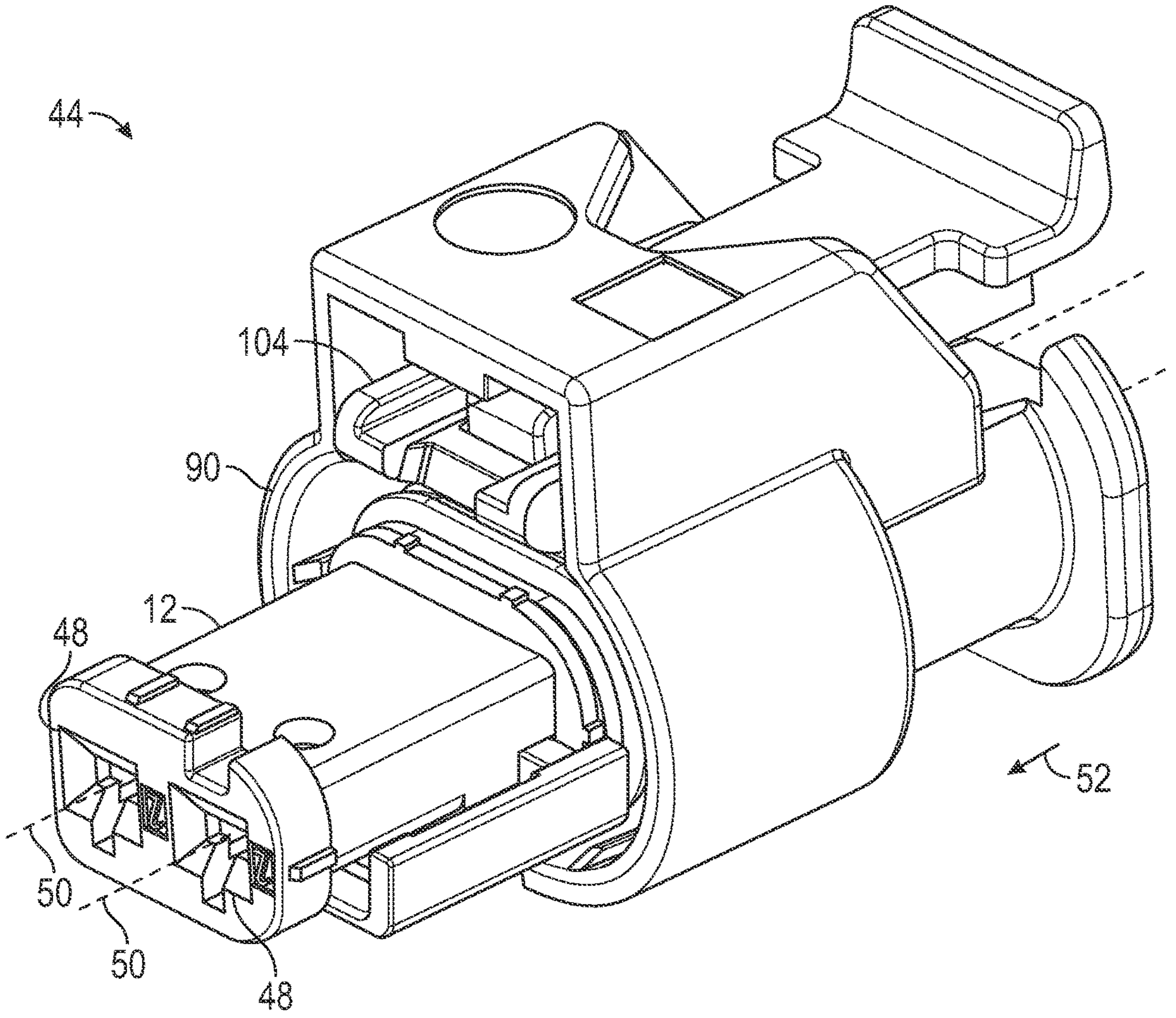
FIG. 4 is a front perspective view of an improved electrical connector in accordance with this invention.

The connector housing 90 further includes a plurality of housing stops 100 that, in the illustrated embodiment, are wedge-shaped projections on the housing seat 92. The illustrated connector housing 90 includes four of such housing stops 100, but any desired number thereof may be provided. As shown in FIG. 5, the terminal housing 46 includes a plurality of housing catches 102 that, in the illustrated embodiment, are grooves provided in the retained portion 86. Two of such housing catches 102 are visible in FIG. 5, and the illustrated terminal housing 46 includes two additional housing catches 102 that are located on the opposite side that are not visible in FIG. 5. When the terminal housing 46 is moved into the housing seat 92, the housing stops 100 engage the terminal housing 46, and the housing seat 92 is deflected away from the terminal housing 46. When the terminal housing 46 reaches an installed position relative to the connector housing 90 (such as shown in FIG. 4), each of the housing stops 100 is positioned adjacent to one of the housing catches 102, and the housing seat 92 rebounds. Each of the housing stops 100 then engages the respective housing catch 102 to retain the terminal housing in the installed position relative to the connector housing 90.

Figure 10:
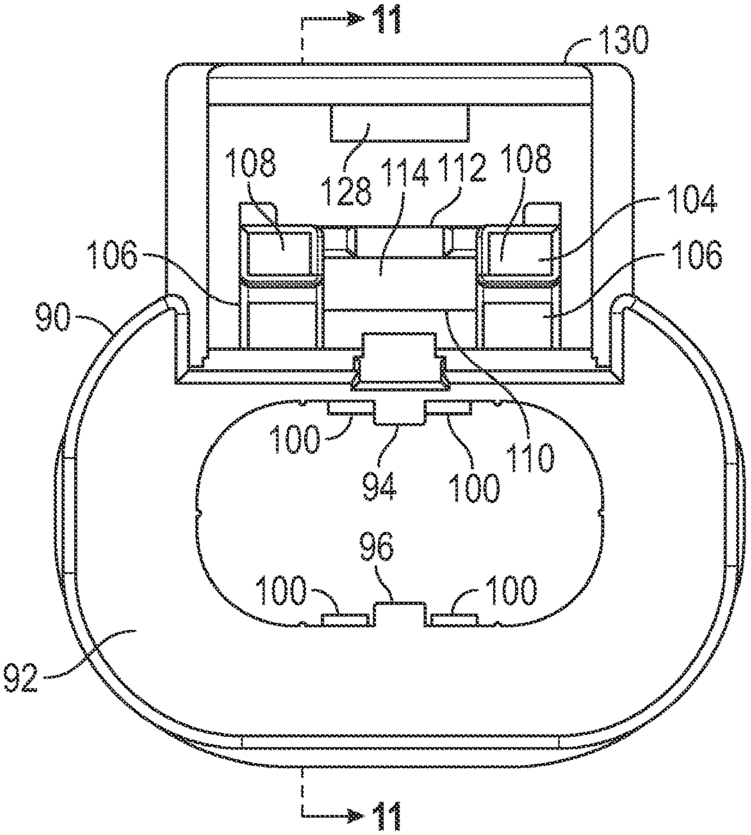
FIG. 10 is an elevational end view of the connector housing illustrated in FIG. 5.

The electrical connector 44 additionally includes a connector latch 104 that is adapted to retain the electrical connector 44 in position relative to the corresponding connector. The illustrated connector latch 104 includes two resilient legs 106 that are attached to the housing seat 92. Each leg 106 is attached to a respective beam 108 that extends generally parallel to the insertion direction 52. As shown in FIG. 10, a generally T-shaped groove 110 is defined between the beams 108. The illustrated groove 110 extends in the insertion direction 52 to a latch stop 112 that is connected to each of the beams 108. The beams 108 are also each connected to a clasp 114 further in the insertion direction 52.

Figure 12:
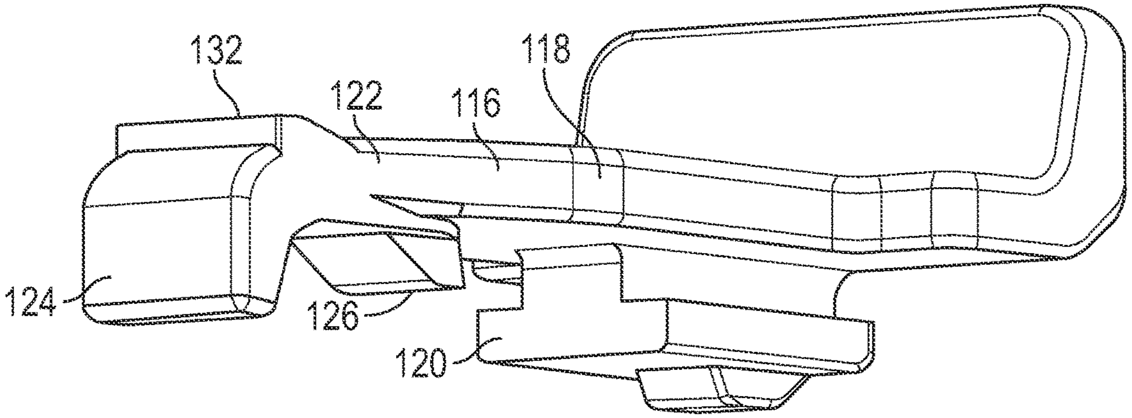
FIG. 12 is an enlarged perspective view from below of the connector position assurance illustrated in FIG. 5.

FIG. 12 illustrates a connector position assurance 116 that, in the illustrated embodiment, is molded from plastic. However, the connector position assurance 116 may be made of any desired material or combination of materials and by any desired process. The connector position assurance 116 includes a core 118 having a T-shaped rail 120 attached thereto. The connector position assurance 116 also includes a hook arm 122 that extends from the core 118 generally in the insertion direction.

Figure 13:
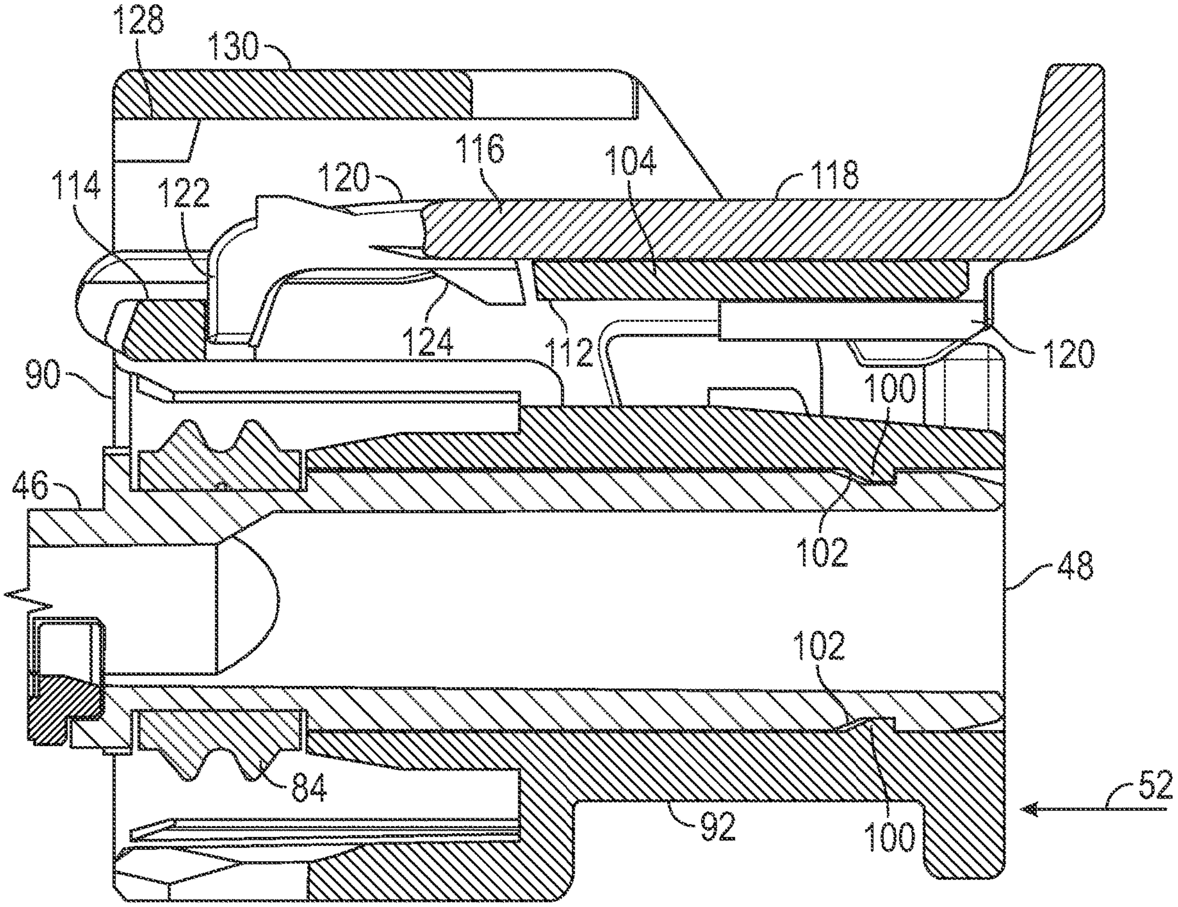
FIG. 13 is a cross-sectional view of the connector housing showing the connector position assurance in a pre-lock position.

FIG. 13 shows the terminal housing 46 attached to the housing seat 92 on the connector housing 90 and the connector position assurance 116 attached to the connector latch 104 in a pre-lock position. When connector position assurance 116 is attached to the connector latch 104, the core 118 is located next to the beams 108, and the rail 120 is located in the groove 110. When the connector position assurance 116 is located in the pre-lock position, an outer hook 124 on the hook arm 122 engages the clasp 114 to prevent the connector position assurance 116 from being moved in the insertion direction 52 relative to the connector latch 104. Also, an inner hook 126 on the hook arm 122 engages the latch stop 112 to prevent the connector position assurance 116 from being moved opposite the insertion direction 52 relative to the connector latch 104. Further, the beams 108 are located between the core 118 and the rail 120 and further prevent the connector position assurance 116 from being moved relative to the connector latch 104.

The clasp 114 is adapted to engage the corresponding connector (not shown) in order to retain the electrical connector 44 in a mated position relative to the corresponding connector. As is known in the art, when the electrical connector 44 is mated with the corresponding connector, the latch 104 is initially moved to an opened position, then subsequently rebounds to the illustrated closed position, wherein the clasp 114 engages the corresponding connector. As is also known in the art, the corresponding connector engages the outer hook 124 and moves it out of engagement with the clasp 114 by deflecting the hook arm 112. The connector position assurance 116 can then be moved relative to the connector latch 104 in the insertion direction 52.

Figure 14:
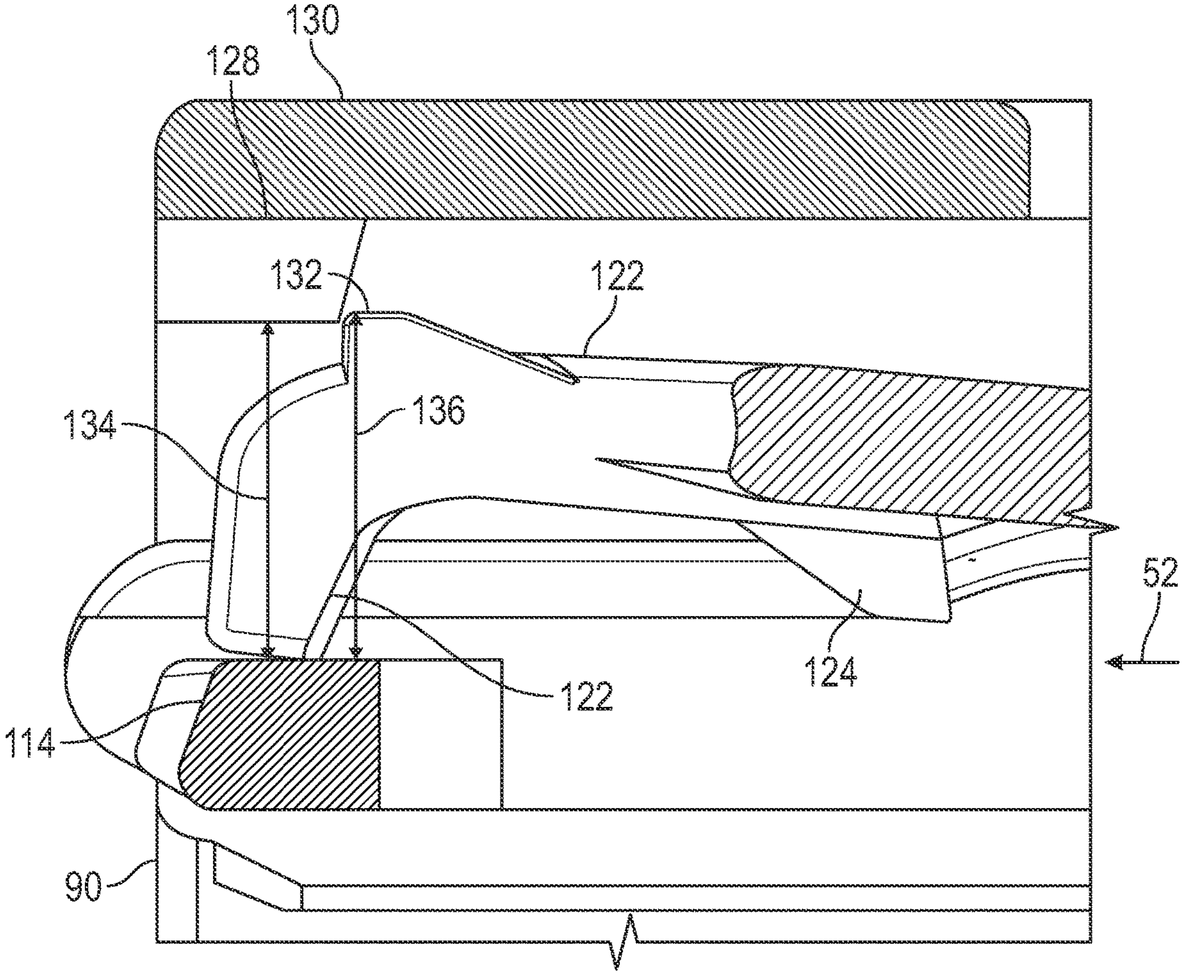
FIG. 14 is an enlarged cross-sectional view similar to FIG. 13 showing the connector position assurance initially moved away from the pre-lock position and into engagement with a block on the connector housing.

FIG. 14 illustrates when the connector position assurance 116 has been moved in the insertion direction 52 relative to the connector latch 104. The electrical connector 44 includes a block 128 that engages the hook arm 112 when the connector position assurance 116 is moved in the insertion direction 52 from the pre-lock position. The illustrated block 128 is located on a shield 130 that is attached to the connector housing 90 and is positioned such that the connector latch 104 is located between the shield 130 and the housing seat 92.

The block 128 engages the hook arm 112 to restrict movement of the connector position assurance 116 in the insertion direction 52. The illustrated hook arm 112 includes a bump 132 on the side of the hook arm 112 opposite the outer hook 124 that engages the block 128. The clasp 114 and the block 128 define a restricted height 134 therebetween, and the outer hook 122 and the bump 132 define a hook height 136 that is larger than the restricted height 134. As a result, an operator must apply additional force in order to move the connector position assurance 116 further in the insertion direction 52. In the illustrated embodiment, the operator must apply sufficient force to deflect the block 128 and the shield 130 in order to move the connector position assurance 116 further in the insertion direction. This is advantageous because it helps prevent the connector position assurance 116 from being moved unintentionally. It will be appreciated that the amount of force required to move the connector position assurance past the block 128 may be adjustable, such as by selecting values for the size of the block 128, the size of the bump 132, and the strength of the shield 130, for example.

Figure 15:
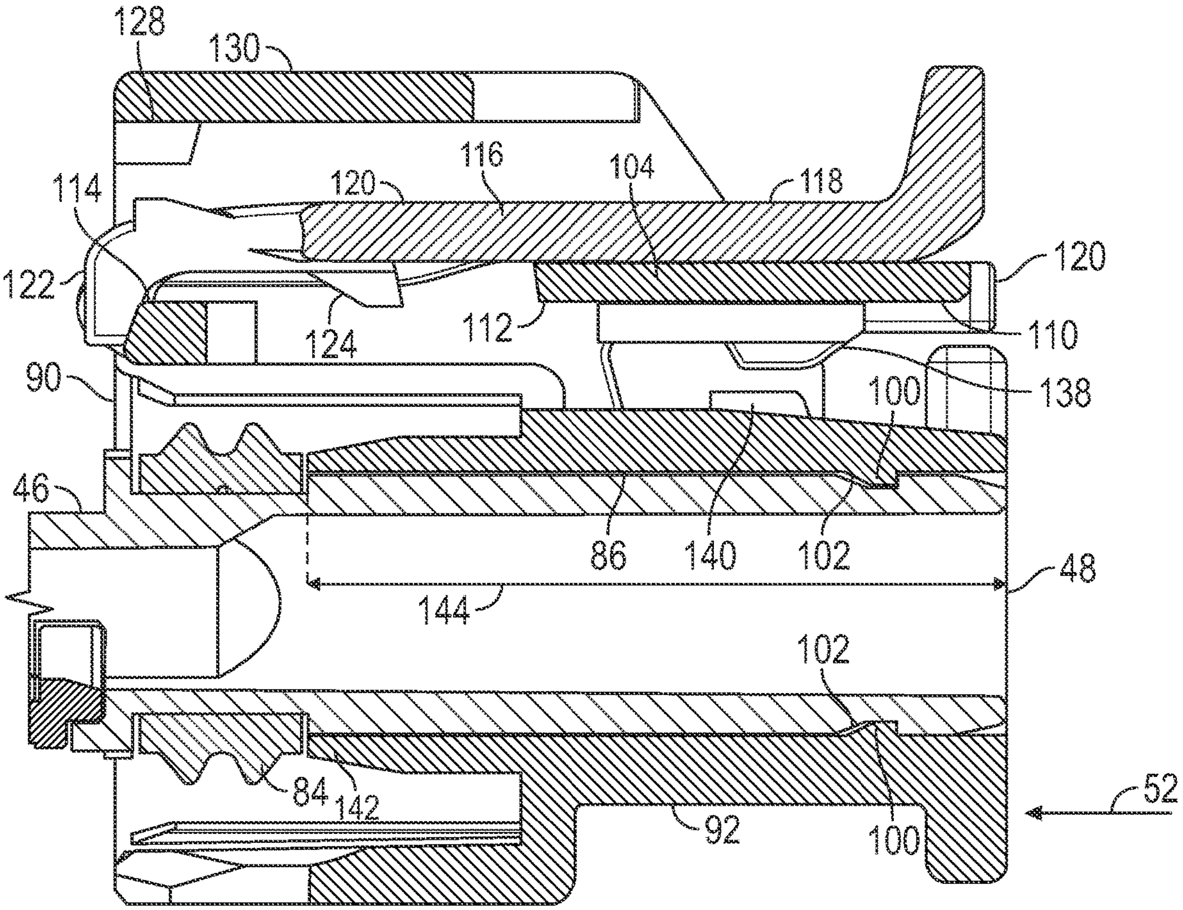
FIG. 15 is a cross-sectional view similar to FIG. 14 showing the connector position assurance moved further to an assurance position.

FIG. 15 illustrates the connector position assurance 116 after being moved to an assurance position relative to the connector latch 104. As is well known in the art, when the connector position assurance 116 is located in the assurance position, it prevents the connector latch from being moved from the closed position to the opened position, and the connector position assurance 116 functions as a lock reinforcement to prevent the connector latch 104 from releasing the corresponding connector.

The connector position assurance 116 also includes a housing block 138 that extends toward the housing seat 92. As previously described, when the terminal housing 46 is inserted into the housing seat 92, the housing stops 100 engage the terminal housing 46, and the housing seat 92 is deflected away from the terminal housing 46. This allows the terminal housing 46 to be moved into the housing seat 92 until the housing stops 100 are aligned with the housing catches 102, and the housing seat 92 rebounds to the shape shown in FIG. 14. The housing block 138 is positioned to limit the amount of deflection of the connector seat 92 away from the terminal housing 46. If a force is applied to remove the terminal housing 46 from the connector housing 90, the connector seat 92 will be deflected by the housing stops 100. However, the connector seat 92 will engage the housing block 138, which will increase the amount of force that is required to deflect the connector housing 90 and, therefore, the amount of force that is required to remove the terminal housing 46 from the connector housing 90. In the illustrated embodiment, the connector housing 90 includes a step 140 that extends from the connector housing 92 toward the housing block 138. However, the housing block 138 may be extend farther toward the connector housing 92 if desired. Additionally, in the illustrated embodiment, a space is provided between the housing block 138 and the step 140 when the connector housing 92 is not deflected. However, the housing block 138 may engage the step 140 or the connector housing 92 if desired.

As further shown in FIG. 14, when the terminal housing 46 is positioned in the housing seat 92, the retained portion 86 of the terminal housing 46 is located in the housing seat 92. A seat end 142 is located adjacent to the seal 84. This provides a greater length of the terminal housing 46 to be located in and supported by the connector seat 92, as compared to the prior art electrical connector 10. The illustrated terminal housing 46 has a retained length 144 of approximately 13 mm. This is advantageous over the prior art electrical connector 10 because providing a larger contact length between the terminal housing 46, and the connector housing 90 decreases the amount of relative movement between the components. This is particularly useful when the electrical connector 44 is installed in a location that is subject to vibrations which could cause the components to move separately from each other.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An electrical connector, comprising:

a housing that is adapted to mate with a corresponding electrical connector;

a connector latch provided on the housing that is adapted to retain the housing in a mounted position on the corresponding electrical connector;

a connector position assurance supported on the housing, the connector position assurance is movable from a pre-lock position to an assurance position when the housing is attached to the corresponding electrical connector; and a block provided on a shield positioned on the housing, wherein the block engages the connector position assurance when the connector position assurance is moved from the pre-lock position to the assurance position to resist movement of the connector position assurance to the assurance position.

2. The electrical connector of claim 1, wherein the connector latch is positioned between the shield and a housing seat positioned on the housing.

3. The electrical connector of claim 1, wherein the connector latch includes a clasp, a restricted height is defined between the clasp and the block, a portion of the connector position assurance is moved through the restricted height when the connector position assurance is moved from the pre-lock position to the assurance position, and the portion of the connector position assurance has a height that is larger than the restricted height.

4. The electrical connector of claim 3, wherein the connector housing includes a shield such that the connector latch is between the shield and the housing seat, and wherein the block is located on the shield.

5. An electrical connector, comprising:

a terminal housing that is adapted to hold one or more electrical terminals;

a connector housing that includes a connector seat, wherein a portion of the terminal housing is supported on the connector seat;

a connector position assurance supported on the connector housing, the connector position assurance is movable from a pre-lock position to an assurance position when the connector housing is attached to the corresponding connector, the connector position assurance including a housing block that extends toward the connector seat to limit deflection of the connector seat.

6. The electrical connector of claim 5, the connector housing including a step that extends from the connector seat, wherein the step is located between a stop positioned on the connector housing and the connector seat when then the connector position assurance is in the assurance position.

7. The electrical connector of claim 6, wherein the step is not located between the stop and the connector seat when then the connector position assurance is in the pre-lock position.

8. The electrical connector of claim 5, wherein the housing block does not limit deflection of the connector seat when the connector position assurance is in the pre-lock position.

9. The electrical connector of claim 5, the terminal housing including one or more housing catches and the connector housing including one or more housing stops, wherein the stops deflect the connector seat away from the terminal housing when the terminal housing is inserted into the connector seat, and wherein the connector housing rebounds and each of the housing stops is engaged by a housing catch when the terminal housing is in an installed position relative to the connector housing.

10. The electrical connector of claim 9, the connector housing including a step that extends from the connector seat, wherein the step is located between the one or more housing stops and the connector seat when then the connector position assurance is in the assurance position.

11. The electrical connector of claim 10, wherein the step is not located between the one or more housing stops and the connector seat when then the connector position assurance is in the pre-lock position.

12. An electrical connector, comprising:

a terminal housing that is adapted to hold one or more electrical terminals;

a connector housing that includes a connector seat, wherein a portion of the terminal housing is held in the connector seat;

a connector latch attached to the connector housing that is adapted to retain the connector housing in a mounted position on the corresponding connector;

a connector position assurance attached to the connector latch, the connector position assurance is movable from a pre-lock position to an assurance position when the connector housing is attached to the corresponding connector, the connector position assurance including a housing block that extends toward the connector seat to limit deflection of the connector seat; and a block that engages the connector position assurance when the connector position assurance is moved from the pre-lock position to the assurance position to resist movement of the connector position assurance to the assurance position.

13. The electrical connector of claim 12, the connector housing including a shield attached to housing so that the connector latch is between the shield and the housing seat, wherein the block is located on the shield.

14. The electrical connector of claim 12, wherein the connector latch includes a clasp, and a restricted height is defined between the clasp and the block, wherein a portion of the connector position assurance is moved through the restricted height when the connector position assurance is moved from the pre-lock position to the assurance position and the portion of the connector position assurance is of a height that is larger than the restricted height.

15. The electrical connector of claim 12, the connector housing including a step that extends from the connector seat, wherein the step is located between a stop positioned on the connector housing and the connector seat when then the connector position assurance is in the assurance position.

16. The electrical connector of claim 15, wherein the step is not located between the stop and the connector seat when then the connector position assurance is in the pre-lock position.

17. The electrical connector of claim 12, wherein the housing block does not limit deflection of the connector seat when the connector position assurance is in the pre-lock position.

18. The electrical connector of claim 12, the terminal housing including one or more housing catches and the connector housing including one or more housing stops, wherein the housing stops deflect the connector seat away from the terminal housing when the terminal housing is inserted into the connector seat, and wherein the connector housing rebounds and each of the housing stops is engaged by a housing catch when the terminal housing is in an installed position relative to the connector housing.

19. The electrical connector of claim 18, the connector housing including a step that extends from the connector seat, wherein the step is located between the one or more housing stops and the connector seat when then the connector position assurance is in the assurance position.

20. The electrical connector of claim 19, wherein the step is not located between the one or more housing stops and the connector seat when then the connector position assurance is in the pre-lock position.

* * * * *